(12) United States Patent
Haney et al.

(10) Patent No.: US 8,681,101 B1
(45) Date of Patent: Mar. 25, 2014

(54) FINGER MOUNTED INPUT DEVICE

(76) Inventors: Daniel Haney, Vancouver, WA (US);
Jeffrey M. Leuthold, Woodland, WA (US)

(*) Notice: Subject to any disclaimer, the term of this patent is extended or adjusted under 35 U.S.C. 154(b) by 352 days.

(21) Appl. No.: 13/050,737

(22) Filed: Mar. 17, 2011

(51) Int. Cl.
*G06F 3/033* (2013.01)
*G09G 5/08* (2006.01)

(52) U.S. Cl.
USPC .......................... 345/161; 345/167

(58) Field of Classification Search
USPC .................................. 345/160–163
See application file for complete search history.

(56) References Cited

U.S. PATENT DOCUMENTS

| | | | |
|---|---|---|---|
| 4,787,051 A | 11/1988 | Olson | |
| 5,796,354 A * | 8/1998 | Cartabiano et al. | 341/22 |
| 6,154,199 A | 11/2000 | Butler | |
| 7,737,942 B2 | 6/2010 | Bajramovik | |
| 2004/0080493 A1* | 4/2004 | Kenin | 345/163 |
| 2005/0052291 A1* | 3/2005 | Backman et al. | 341/22 |
| 2008/0252621 A1* | 10/2008 | Shipton | 345/179 |
| 2009/0096746 A1* | 4/2009 | Kruse et al. | 345/156 |
| 2009/0213077 A1* | 8/2009 | Bailen | 345/164 |

* cited by examiner

*Primary Examiner* — Long D Pham
(74) *Attorney, Agent, or Firm* — Bert P. Krages, II (57) ABSTRACT

A finger-mounted input device with an integrated accelerometer that functions as a computer input device capable of transmitting manipulation signals controlled by a touch pad, track ball, or joystick and switching signals controlled by buttons. It can be used in place of a mouse input device when used with a computer or as a supplementary input device in conjunction with a mouse. It can also substitute for hands free controls, remote controls, and other electronic input accessories to extend the versatility of these other electronic tools. The device frees up the user from having to reach and manipulate a detached mouse or similar input device in order to enter commands into a computer or other electronic device.

20 Claims, 6 Drawing Sheets

FINGER MOUNTED INPUT DEVICE

BACKGROUND OF THE INVENTION

Input devices are commonly used with respect to controlling the position of a cursor on computer monitors, highlighted areas on displays of electronic devices, and positional control on gaming programs. Common input devices include the mouse, handheld remote controls, joysticks, game controllers, and keypads. Such devices are controlled by grasping and manipulating the device with the hand or fingers. Typically, a mouse is controlled by moving it over a flat surface to generate a movement signal and activating one or more buttons with a finger. With most input devices the user must locate the input device with a hand which necessitates moving the hand from a previous operating position. Game controllers are bulky and usually require both hands to hold and effectively utilize the component. Most simple functions are controlled by a series of buttons on the mouse or controller by clicking various buttons for commands or scrolling based on cursor location on highlighted areas. These devices require that one or more hands be occupied to complete commands, reducing the capacity of the user to multi-task and precluding a hand from being used for other functions such as writing or keyboard typing. Finally, the bulkiness of larger devices requires accommodation by the body in an unnatural manner with reduced ergonomic comfort.

SUMMARY OF THE INVENTION

The invention is a finger-mounted input device with an integrated accelerometer that is intended to be used with computers and electronic devices. The purpose of the device is to function in place of a conventional mouse or remote controller using wireless and micro technologies to connect with and manipulate devices in a multitude of electronic device and computer environments. It can be used in place of a mouse input device in one embodiment or used in the form of an enhanced embodiment that is capable of carrying out complex functions useful to advanced computer and electronic device applications. The device frees the user from having to reach for, and manipulate a detached mouse or similar input device in order to enter commands into a computer. From an ergonomic standpoint this apparatus has many benefits that reduce physical ailments associated with operating computer and electronic devices. The input device will also allow disabled persons increased freedom when operating such devices The invention encompasses the following elements:
  one or more input components (e.g., touchpad, trackball, joystick, buttons),
  accelerometer,
  wireless transmission unit
  finger mounting structure
  battery system
  operating software or firmware There are three preferred embodiments of the input device. One version has two toggled function keys and an accelerometer activation button. This embodiment has the appearance of a ring with a digital pad in its face, as a jewel is to a ring. The embodiment has the two function keys (right and left click buttons) embedded in the digital pad located at the top of the embodiment. The accelerometer activation button is located in the bezel portion of the ring nearest the thumb adjacent to the charging port.

The second embodiment is in the form of a sleeve worn over an index finger and has four function keys and one digital pad. The operating components are mounted in a sewn pocket or by a covering piece that fastens over the components and is secured by using a snap or a hook-and-loop fastener. A third embodiment has a digital pad surrounded by four function keys and an additional roller tracking ball or joystick adjacent to the digital pad that is also surrounded by four function keys for additional command options. This embodiment thus has a total of eight function keys. The second and third embodiments are joined with a spring joint between the digital pad and roller-tracking ball to allow the sleeve to flex with the movement of the user's fingers. The electrical and command wiring is connected from one side of the input device to the other by a pivot joint that permits the input device to bend with the finger without fatiguing the wiring. A charging port is located off the side nearest the hand.

The input device is operated by manipulation using the thumb over the bent index finger. Because of the symmetry of the design, the input device may be worn on either the right or left hands. The digital pad, roller tracking ball, or joystick, as well as the function keys, are pressed or manipulated using the thumb. The digital pad, roller tracking ball, joystick, and function keys can be programmed through a software interface. The software options, and preferences can be determined by the user depending on the intended use. The input devices can communicate with a computer or other electronic device using wireless communication such as a radio-frequency (RF) transmitter such as the Bluetooth open wireless technology standard. However, any wireless technology that enables communication between the device and the component into which commands are to be inputted can be used, Examples of the applications with which the input device can be used to provide inputs include but are not limited to computers, televisions, theater systems, cellular telephones, electrically-operated automotive accessories, video games or gaming stations, drones, medical devices, military controllers, graphic design, and CAD drawing.

The device uses both fine and gross motor skills separately, or in combination, through the touch pad, roller tracking ball, joystick, and accelerometer. The accelerometer enables the user to control the position of cursors on a display screen, highlight text or objects, and position graphic symbols using large-gesture painterly motions. The input device allows the combined motion of the hand and thumb to input commands to a computer or other electronic device. The accelerometer function can be selected by depressing one of the function keys which then allows movement of the entire input device to act as a cursor position controller. The function keys can also cause the accelerometer to zero out which provides the technology a point of reference from which to begin the motion of the user's hand. Many people suffering from serious neurological conditions, such as quadriplegia and cerebral palsy, retain some level of large-motion or fine motion motor skill movement. The signals from the accelerometer offers the possibility of enabling disabled persons to input commands to computers and other devices more effectively, thus enhancing their ability to use electronic devices.

The battery in the device can be charged in a variety of ways including a USB connection, charging cradle, or proximity charger. The docking station can be equipped with either a peg base with a charging ring, cord, or inductive charger.

DETAILED DESCRIPTION

Figure 1:
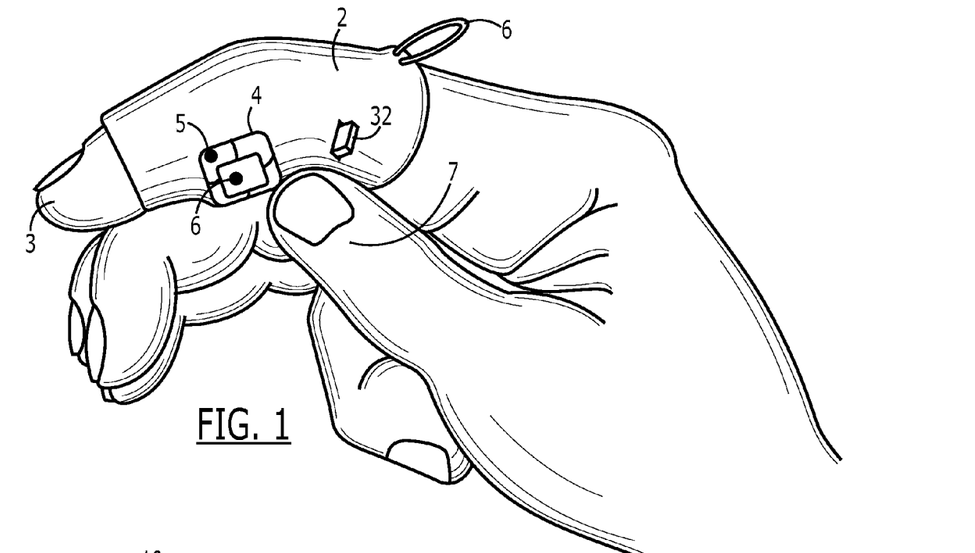
FIG. 1 is a side view of a finger sleeve embodiment showing a touch pad.

The exterior of the finger-sleeve device having a touch pad with four function keys is shown in FIG. 1. The device can be mounted on an index finger 3 in the form of a sleeve 2. The sleeve may be made of various materials well know in the art for use in gloves including spandex-fiber blends and glove leather. It may encompass a small pull strap 6 to facilitate fitting onto the index finger 3. The sleeve 2 is constructed to contain the components so that, when worn on the index finger 2, the touch pad assembly 4 (which contains function keys 5 and touch pad 6) and charger connection 32 are visible from the external side of the sleeve 2 (the charging port is located so as not to interfere with, or rub on the thumb or hand). The sleeve can be constructed so that the components are attached by sewing or by a covering piece that fastens over the components and is secured by using a snap or hook-and-loop fastener. The touch pad assembly 6 is positioned so that it may be operated by the thumb 7. The symmetry of the device allows for wearing the device on either the left or right hands.

Figure 2:
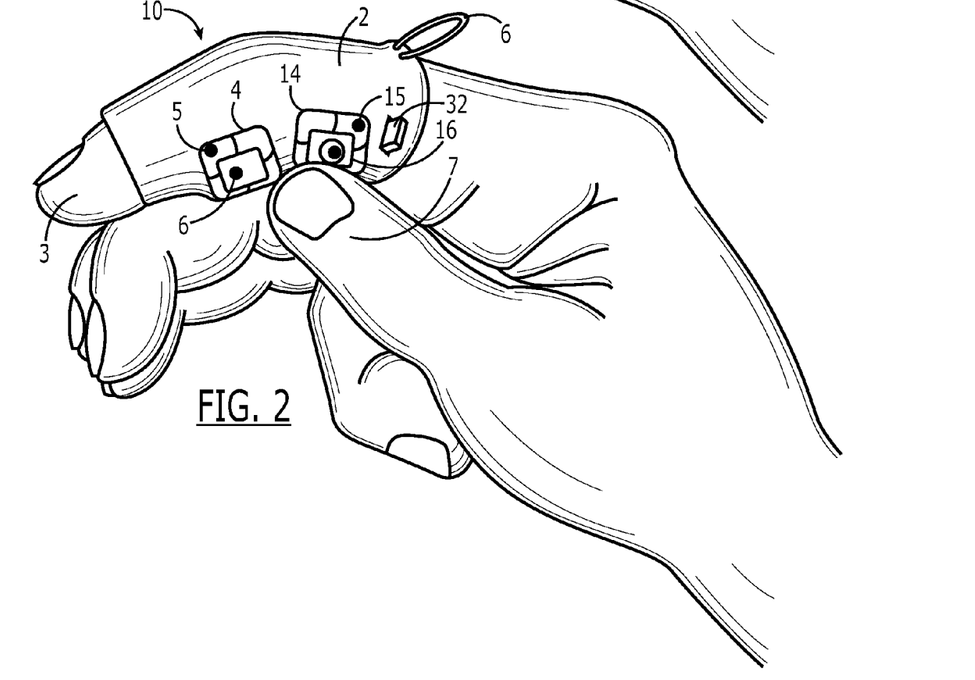
FIG. 2 is a side view of a finger sleeve embodiment showing a touch pad and track ball.

Shown on FIG. 2 is the exterior of the finger-sleeve device 10 having a touch pad assembly 4 with four function keys 5 and a track ball assembly 14. The device can also be mounted on an index finger 3 in the form of a sleeve 2 in the manner described above. The sleeve 2, in this embodiment is constructed to contain the components so that, when worn on the index finger 2, the touch pad assembly 4 (that contains function keys 5 and touch pad 6), the track ball assembly 14 (containing four function keys 15 and a track ball 16), and charger connection 32 are visible from the external side of the sleeve 2. The sleeve can likewise be constructed so that the components are attached in a manner similar to that described above for FIG. 1. The touch pad assembly 6 and track ball assembly 14 are positioned so that they may be operated by the thumb 7 of the wearer.

Figure 3:
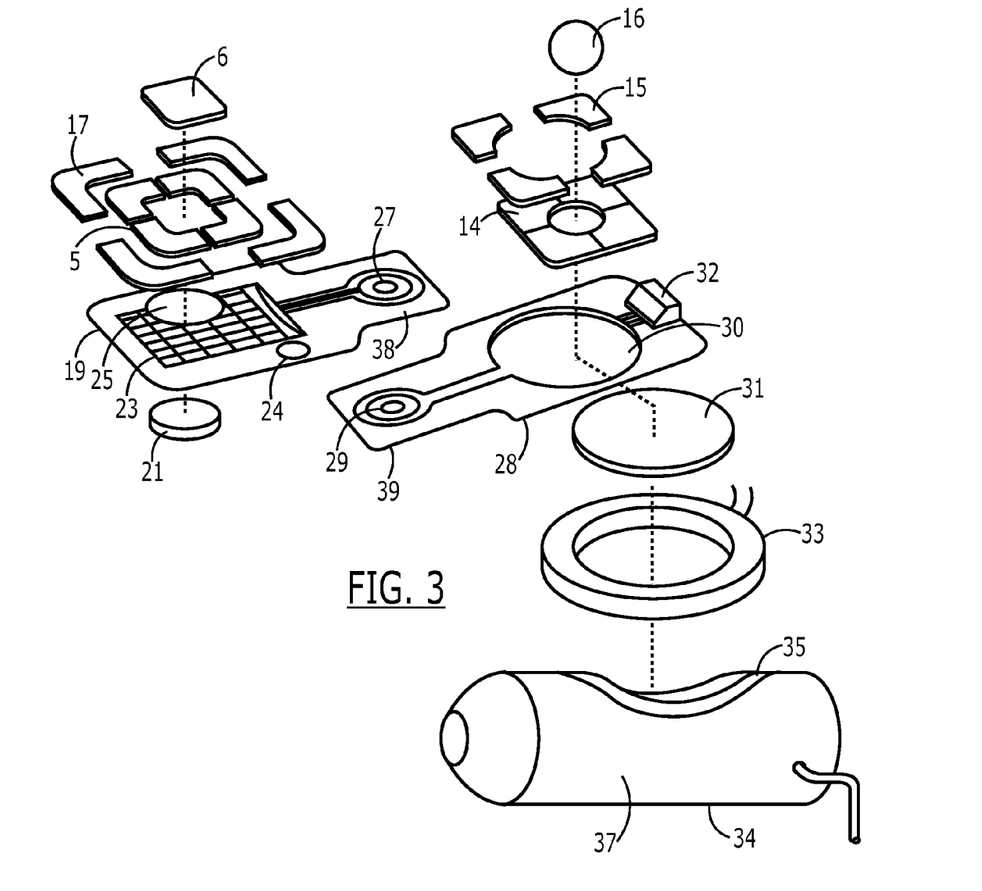
FIG. 3 is an exploded view of the operating components associated with the finger sleeve embodiment having a touch pad and track ball.

FIG. 3 shows the operating components of the finger-sleeve embodiment. The track pad 6 and function keys 5 fit onto the touch pad receiving assembly 17 and are connected to a motherboard 23 that is mounted on a first mounting board 19. The motherboard 23 has a module that provides RF transmitter and receiver capabilities. The first mounting board 19 has an accelerometer space 25 into which an accelerometer 21 is fitted. The accelerometer 21 is also connected to the motherboard. The first mounting board 19 has a first end 38 onto which a first connecting knuckle 27 is present. The first connecting knuckle is connected electrically to the motherboard 23. A track ball 16 and function keys 15 are fitted onto a track ball receiving plate 14 that is mounted onto a second mounting board 28. These are connected electrically to a second connecting knuckle 29 which is present at the second end 39 of the second mounting plate 28. The second mounting plate has a battery opening 30 into which a battery 31 is fitted. A charger/USB connector 32 is fitted onto the second mounting plate and electrically connected to the second connecting knuckle and the battery 31.

In operation, the first connecting knuckle 27 is in physical contact with the second connecting knuckle 29 in such a manner that electrical contact of the components on the second mounting plate 28 is maintained with the components on the first mounting plate 19 without fatigue or stress. However, any means of maintaining a flexible electrical connection may be used including wires or ribbon cable. The first connecting knuckle 27 and second connecting knuckle 29 can be affirmatively maintained in constant engagement by means such as a press fit, snap lock, connecting pin, or free-fitting but interlocking components.

A first induction coil 33 is mounted to the second mounting plate adjacent to the battery opening 30 and is electrically connected to the battery 31. This inductive charging system can be present on all of the units but is an optional part of the device for operation. FIG. 3 also depicts a separate inductive charging unit 34 comprising a second induction coil 35 which is the mate to the device mounted coil, and mounted within a cylindrical housing 37 which serves as the unit's dock.

The touch pad 6 is used to generate an electrical signal in accordance with movement of the thumb 7 over the surface of the touch pad. The function keys 5 provide electrical switching functions. Similarly, the track ball 16 is used to generate an electrical signal in accordance with rotation of the track ball 16 within the track ball receiving plate 14. The associated function keys 15 provide electrical switching functions. The accelerometer 21 generates electrical signals in accordance with large-gesture motions by the user. The accelerometer 21 may be made to generate electrical signals that control specific activities such as a cursor or scrolling by pressing specific function keys 5 or 15 (any of the eight keys can be programmed to respond to the signals from the accelerometer). Software or firmware may be stored in a memory module within the motherboard 23 to enable the user to control cursor functions and other options to complete a wide range of custom commands depending on user preferences. The software may also be installed in the attending device (i.e., computer or other electronic device) to control what the function key, touch screen, track ball, or joystick do. Note that for the term "software" is intended to encompass all forms of computer programs and related data that provide the instructions telling a computer what to do and how to do it and thus encompasses firmware, middleware, application software, and system software.

The RF transmission capability of the motherboard 23 is used to communicate between the finger-sleeve device and a computer or other device receiving the signals. The signals generated from the touch pad 6, the track ball 16, accelerometer 21, and the function keys 5 and 15 are relayed to the computer by the transmission of RF signals by the motherboard 23. The transmission capability also includes the ability to receive signals. Software may be updated via transmission of RF signals or by connecting a cable from a computer to the charger/USB connector 32. In addition, means for alerting a user that a signal has been received may be incorporated into the device such as a vibrator assembly 24 attached to the motherboard 23, audio speaker, or a light source such as a light emitting diode. These means add to the functionality of the device by permitting users to be notified that certain events have taken place such as the downloading of a file, execution of a program, or receipt of a message.

The battery 31 may be charged conductively via electricity supplied into the charger/USB connector 33 or alternatively inductively charged by placing the first induction coil 33 in adjacent proximity with an electrically-energized second induction coil 35. Ideally, the second induction coil 35 would be mounted within an cylindrical post housing 37 so that when the sleeve 2 is slid onto the cylindrical post, the first induction coil 33 is optimally positioned with respect to the second induction coil 35.

Figure 4:
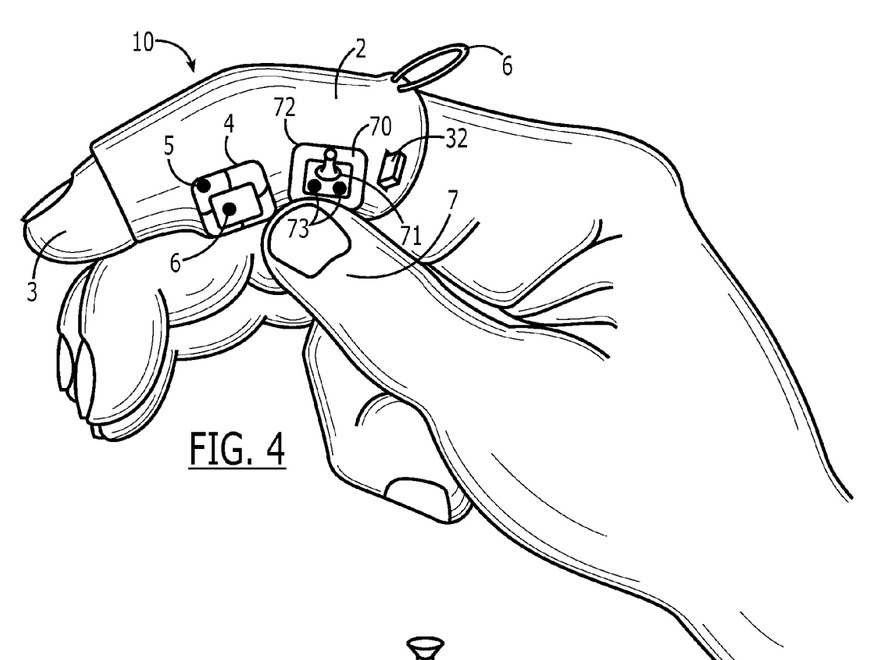
FIG. 4 is a side view of a finger sleeve embodiment showing a touch pad and joystick.

FIG. 4 depicts a modification of the above embodiment in which a joystick stick assembly 70 is used instead of a track ball assembly. The joystick 71 fits within a joystick receiving plate 72 onto which two function buttons 73 are mounted.

Figure 5:
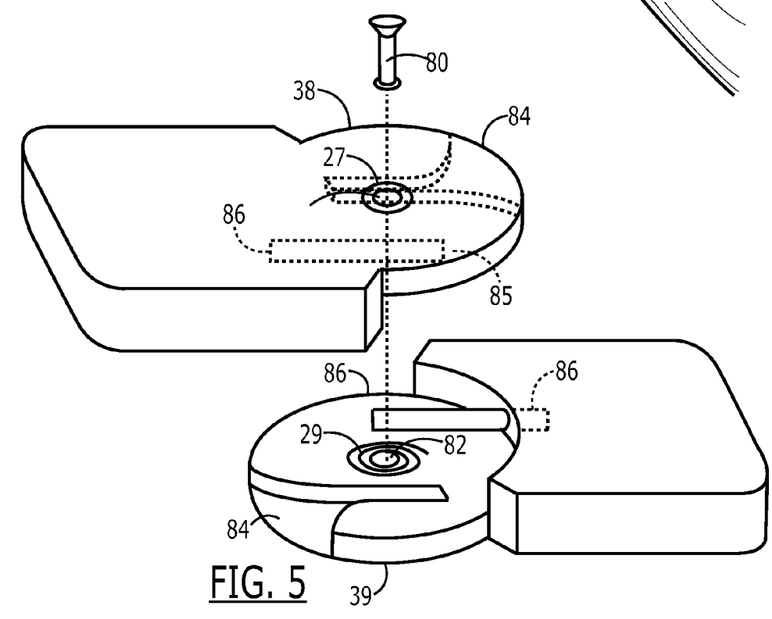
FIG. 5 is an exploded view showing a pivot joint for the finger sleeve embodiments.
Figure 6:
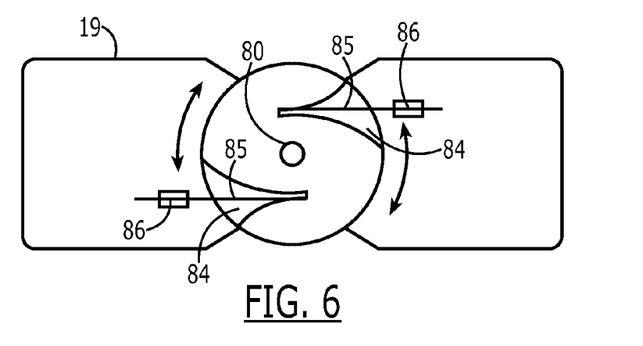
FIG. 6 is a top view showing the pivot joint.
Figure 7:
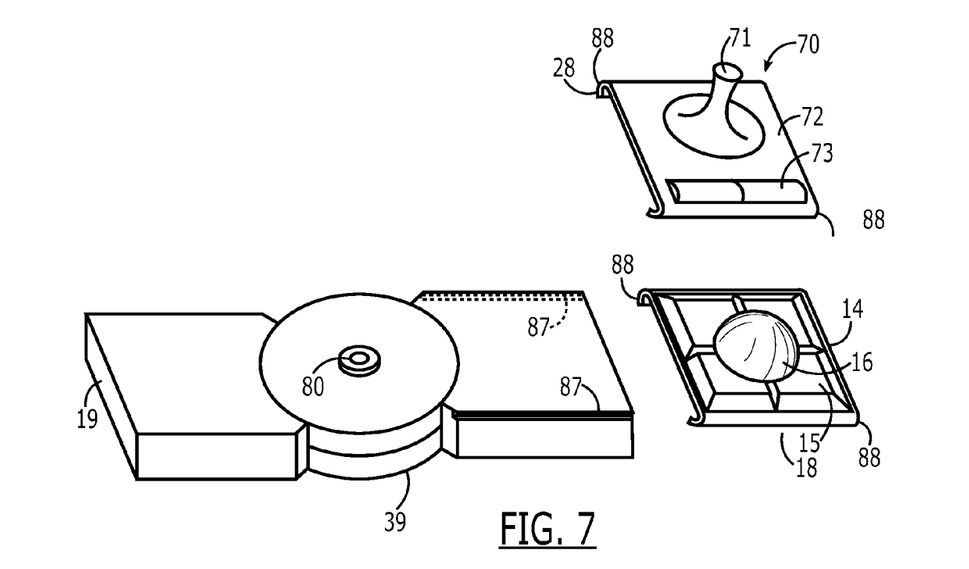
FIG. 7 is a view of the pivot joint and interchangeable input components.

FIG. 5-7 depict a mechanical aspect showing how the first end 38 with first connecting knuckle 27 and the second end 39 with the second connecting knuckle 29 can be joined in a manner that allows the first end 38 and second end 39 to return to a straight position from a flexed position. the first connecting knuckle 27 is movably joined to the second connecting knuckle 29 by a pin 80 that fits through a hole in the first connecting knuckle 27 and a hole in the second connecting knuckle 29. The ends 38 and 39 are fitted with linear spring members 85 which are secured to the ends by a retainer 86. The linear spring members 85 fit into a flared groove 84. This arrangement allows the first end 38 and second end 39 to pivot around the axis of the pin 80 which enhances the ergonomics of the embodiment. When the ends are pivoted, the flexure of the linear spring members 85 within the flared grooves 84 creates an opposing force that encourages the ends to return to a previous unpivoted alignment. This further enhances the ergonomics of the embodiment.

FIG. 7 also depicts guide rails 87 on the second connecting end 39 which are designed to receive channels 88 located on the track ball receiving plate 14 and the joystick receiving plate 72. This allows for the embodiment to be constructed so that the track ball assembly 18 and the joystick assembly 70 are selectively interchangeable. The rails 87 and channels 88 may also incorporate protrusions and recesses that further secure them by creating a snap lock mechanism.

Figures 8, 9:
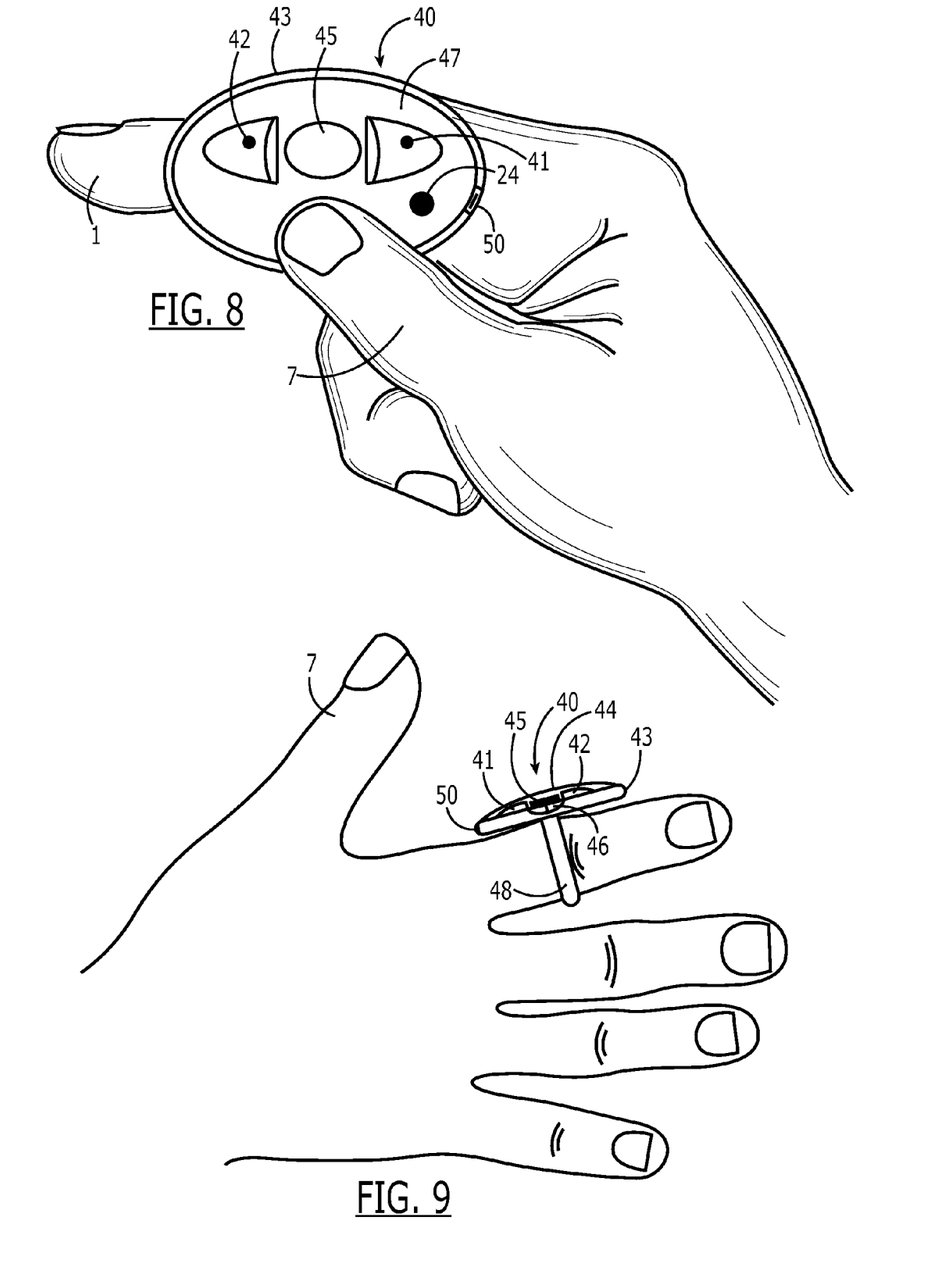
FIG. 8 is a side view of a ring embodiment.
FIG. 9 is a top view of a ring embodiment.
Figure 10:
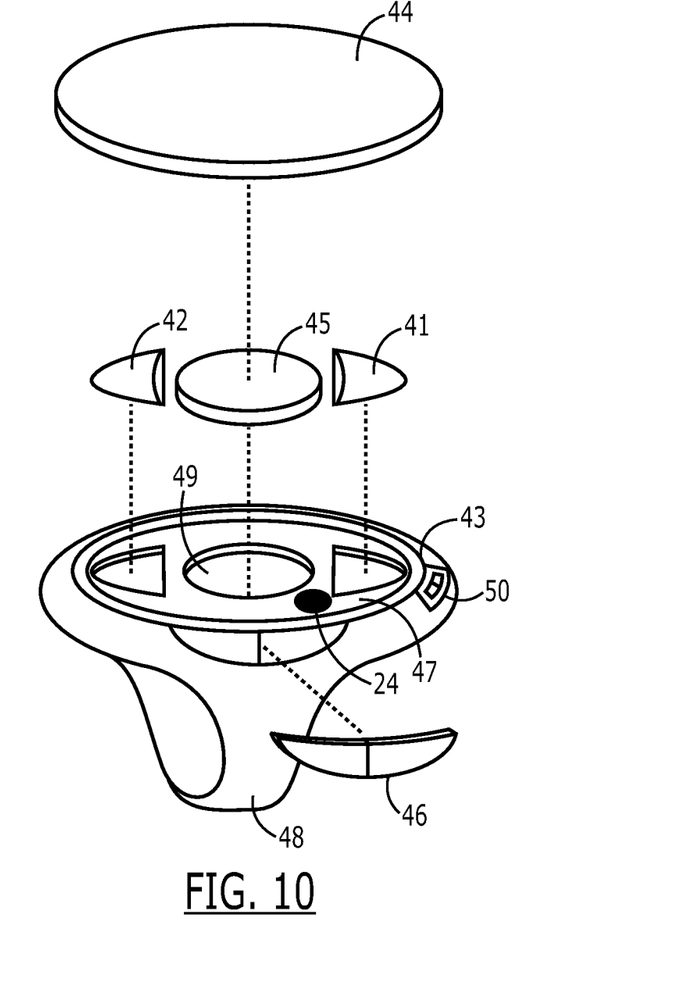
FIG. 10 is an exploded view of the components associated with a ring embodiment.

FIGS. 8-10 depict exterior and exploded views of a ring embodiment of the device 40. In this embodiment, the device 40 is secured to an index finger 1 by a band 48 onto which a bezel 43 is mounted. It should be noted that the term bezel is used broadly to mean the portion of the embodiment that surrounds and holds the functional components. A motherboard 47 is mounted into the bezel and supports a first depressible function key 41 and a second depressible function key 42. The ring embodiment may have an input component consisting of a touch pad, track ball, and joystick. FIGS. 8-10 show a touch pad 44. The location of the depressible keys allow the touchpad 44 to toggle or tilt, depressing the keys. The accelerometer 45 is located at the center of the motherboard 47 where it is secured within the opening 49. The motherboard 47 has modules that enable RF transmission and receiving as well as memory storage. In addition, means for alerting a user that a signal has been received may be incorporated into the device such as a vibrator assembly 24 attached to the motherboard 47, audio speaker, or a light source such as a light emitting diode. The touch pad 44 is installed onto the bezel 43 in a manner that enables it to rock back and forth and thus engage the first depressible function key 41 and a second depressible function key 42 when it is depressed on either end overlying those function keys. The touch pad 44 also acts as a cover and protects the motherboard 47, first depressible function key 41, the second depressible function key 42, and the accelerometer. A detentible key/lock 46 is located at the side of the bezel 43 and may be selectively pressed to activate or deactivate the touch pad 44. It can also be used to or activate or deactivate the accelerometer 45. A charger/USB connector 50 is located on the bezel and is connected to the motherboard 47 and the battery (not shown in FIGS. 8-10 but located beneath the motherboard).

The device 40 may be placed onto an index finger 1 so that the users thumb 7 is positioned to engage the touch pad 44, first depressible function key 41, the second depressible function key 42, and the detentible key/lock 46. The device 40 may also be equipped with an induction coil (not shown) to permit inductive charging as described for the finger-sleeve embodiment.

The device 40 of the ring embodiment operates substantially the same as for the finger-sleeve embodiment. The touch pad 44 is used to generate an electrical signal in accordance with movement of the thumb 7 over the surface of the touch pad. The first depressible function key 41 and second depressible function key 42 provide electrical switching functions. As described above, the device 40 may be programmed so that the detentible key/lock 46 can be selectively pressed to lock or unlock the touch pad 44, or activate or deactivate the accelerometer 45. The accelerometer 45 generates electrical signals in accordance with large-gesture motions by the users finger 1, hand, wrist, or arm and may by recognizing its location in space be made to generate electrical signals that control specific activities such as drawing, cursor movement, or page scrolling by pressing first depressible function key 41 or second depressible function key 42. Software may be stored in a memory module on the motherboard 47 to enable the user to control cursor functions and other options to complete a wide range of custom commands depending on user preferences. The RF transmission capability of the motherboard 47 is used to communicate between the device 40 and a computer or other device receiving the signals. The signals generated from the touch pad 44, accelerometer 45, and the first depressible function key 41 and second depressible function key 42 are relayed to the computer by the transmission of RF signals by the motherboard 47. Software may be inputted into the motherboard 47 via transmission of RF signals or by connecting a cable from a computer to the charger/USB connector 50.

Although the invention has been described with reference to a particular arrangement of parts, features, and the like, these are not intended to exhaust all possible arrangements or features, and indeed many other modifications and variations will be ascertainable to those of skill in the art.

We claim:

1. An input device, comprising:
   a sleeve to be worn on a finger;
   an input component is selected from a group consisting of a touch pad, track ball, and joystick, attached to said sleeve to generate manipulation signals in accordance with manipulation by a thumb on said input component;
   a plurality of function keys attached to said sleeve to generate switching signals;
   an accelerometer to generate movement signals in response to movement of a hand attached to said finger in which at least one of the function keys can generate a switching signal causing the accelerometer to zero out and provide a point of reference from which to begin the motion of said hand;
   a battery; and
   a transmitter for transmitting said manipulation signals, said movement signals, and said switching signals.

2. The input device of claim 1 further comprising a first induction coil for charging said battery and a cylindrical post containing a second induction coil capable of selectively receiving said sleeve by sliding said sleeve onto said cylindrical post so that the first induction coil is positioned proximate to the second induction coil.

3. The input device of claim 1 wherein said manipulation signals are for controlling the movement of a cursor in a video display and said switching signals are for controlling mouse-clicking functions and in which said input component can be selectively attached and detached to said input device.

4. The input device of claim 1 further comprising a pivot joint between a first mounting board and a second mounting board.

5. The input device of claim 1 further comprising a pivot joint between a first mounting board and a second mounting board, said pivot joint further comprising a spring mechanism located within said first mounting board and second mounting board and biasing said pivot joint to an unpivoted state.

6. The input device of claim 1 further comprising means for alerting a user that a signal has been received indicating that a file has been downloaded or a message has been received by another device.

7. An input device, comprising:
a sleeve to be worn on a finger;
a first input component attached to said sleeve to generate manipulation signals in accordance with manipulation by a thumb on said first input component;
a second input component attached to said sleeve to generate manipulation signals in accordance with manipulation by said thumb on said second input component;
a plurality of function keys attached to said sleeve to generate switching signals;
an accelerometer to generate movement signals in response to movement of a hand attached to said finger in which at least one of the function keys can generate a switching signal causing the accelerometer to zero out and provide a point of reference from which to begin the motion of said hand;
a battery; and
a transmitter for transmitting said manipulation signals, said movement signals, and said switching signals to a computer.

8. The input device of claim 7 wherein said first input component is selected from a group consisting of a touch pad or track ball.

9. The input device of claim 7 wherein said second input component is a joystick.

10. The input device of claim 7 further comprising a first induction coil for charging said battery and a cylindrical post containing a second induction coil capable of selectively receiving said sleeve by sliding said sleeve onto said cylindrical post so that the first induction coil is positioned proximate to the second induction coil.

11. The input device of claim 7 wherein said manipulation signals are for controlling the movement of a cursor in a video display of a computer and said switching signals are for controlling mouse-clicking functions and in which said second input component can be selectively attached and detached to said input device.

12. The input device of claim 7 further comprising a pivot joint between a first mounting board and a second mounting board, such that when said sleeve is worn on an index finger, the first input component is positioned between the proximal interphalangeal joint and the distal interphalangeal joint, and the second input component is positioned between the metacarpophalangeal joint and the proximal interphalangeal joint.

13. The input device of claim 7 further comprising a pivot joint between a first mounting board and a second mounting board, said pivot joint further comprising a spring mechanism biasing said pivot joint to an unpivoted state.

14. The input device of claim 7 further comprising means for alerting a user that a signal has been received indicating that a file has been downloaded or a message has been received by another device.

15. An input device, comprising:
a ring with bezel to be worn on a user's finger;
an input component selected from a group consisting of a touch pad, track ball, and joystick attached to said bezel to generate manipulation signals in accordance with manipulation by a thumb on said input component;
a plurality of function keys positioned within said bezel to generate switching signals;
an accelerometer to generate movement signals in response to movement of a hand attached to said finger in which at least one of the function keys can generate a switching signal causing the accelerometer to zero out and provide a point of reference from which to begin the motion of said hand;
a battery; and
a transmitter for transmitting said manipulation signals, said movement signals, and said switching signals to an electronic device.

16. The input device of claim 15 further comprising a first induction coil for charging said battery and a cylindrical post containing a second induction coil capable of selectively receiving said bezel by sliding said bezel onto said cylindrical post so that the first induction coil is positioned proximate to the second induction coil.

17. The input device of claim 15 wherein said manipulation signals are for controlling the movement of a cursor in a video display and said switching signals are for controlling mouse-clicking functions and in which said input component can be selectively attached and detached to said input device.

18. The input device of claim 15 further comprising a key/lock to selectively activate or deactivate said input component.

19. The input device of claim 15 further comprising a key/lock to selectively activate or deactivate said accelerometer.

20. The input device of claim 15 further comprising means for alerting a user that a signal has been received indicating that a file has been downloaded or a message has been received by another device.

* * * * *